(12) United States Patent
Skocek et al.

(10) Patent No.: US 11,111,180 B2
(45) Date of Patent: Sep. 7, 2021

(54) BUILDING ELEMENTS MADE FROM BINDERS HARDENING BY COMBINED HYDRATION AND CARBONATION

(71) Applicant: HConnect 2 GmbH, Heidelberg (DE)

(72) Inventors: Jan Skocek, Leimen (DE); Maciej Zajac, Heidelberg (DE); Mohsen Ben Haha, Heidelberg (DE); Frank Bullerjahn, Leimen (DE)

(73) Assignee: HConnect 2 GmbH, Heidelberg (DE)

( * ) Notice: Subject to any disclaimer, the term of this patent is extended or adjusted under 35 U.S.C. 154(b) by 0 days.

(21) Appl. No.: 16/754,439

(22) PCT Filed: Sep. 18, 2018

(86) PCT No.: PCT/EP2018/075199
§ 371 (c)(1),
(2) Date: Apr. 8, 2020

(87) PCT Pub. No.: WO2019/072497
PCT Pub. Date: Apr. 18, 2019

(65) Prior Publication Data
US 2020/0339476 A1    Oct. 29, 2020

(30) Foreign Application Priority Data
Oct. 9, 2017  (EP) ..................................... 17195448

(51) Int. Cl.
| C04B 28/18 | (2006.01) |
| C04B 40/02 | (2006.01) |
| B28B 1/14 | (2006.01) |
| C04B 103/30 | (2006.01) |
| C04B 103/32 | (2006.01) |

(52) U.S. Cl.
CPC ........ *C04B 28/188* (2013.01); *C04B 40/0231* (2013.01); *B28B 1/14* (2013.01); *C04B 2103/302* (2013.01); *C04B 2103/304* (2013.01); *C04B 2103/32* (2013.01)

(58) Field of Classification Search
CPC ..... C04B 7/323; C04B 7/3453; C04B 28/065; C04B 28/188; C04B 40/0231; C04B 2103/32; C04B 2103/302; C04B 2103/304; B28B 1/14; Y02P 40/10; Y02P 40/18

See application file for complete search history.

(56) References Cited

U.S. PATENT DOCUMENTS

| 9,067,825 B2 | 6/2015 | Bullerjahn et al. |
| 9,067,826 B2 | 6/2015 | Bullerjahn et al. |
| 9,073,784 B2 | 7/2015 | Bullerjahn et al. |
| 9,073,785 B2 | 7/2015 | Bullerjahn et al. |
| 9,212,091 B2 | 12/2015 | Bullerjahn et al. |
| 9,302,940 B2 | 4/2016 | Bullerjahn et al. |
| 10,173,927 B2 | 1/2019 | Atakan et al. |
| 10,301,217 B2 | 5/2019 | Hill et al. |
| 2011/0165400 A1 | 7/2011 | Quaghebeur et al. |
| 2012/0312194 A1 | 12/2012 | Riman et al. |
| 2019/0009428 A1 | 1/2019 | Dienemann et al. |
| 2019/0152856 A1 | 5/2019 | Atakan et al. |
| 2019/0241471 A1 | 8/2019 | Hill et al. |

FOREIGN PATENT DOCUMENTS

| EP | 3147269 A1 | 3/2017 |
| WO | 2013023729 A2 | 2/2013 |
| WO | 2013023731 A2 | 2/2013 |
| WO | 2016022485 A1 | 2/2016 |
| WO | 2016105383 A1 | 6/2016 |

OTHER PUBLICATIONS

International Preliminary Report on Patentability for PCT/EP2018/075199 dated Apr. 14, 2020.
International Search Report of PCT/EP2018/075199, dated Dec. 5, 2018.
Kristin Majcher : "What happened to Green Concrete? Concrete that absorbs carbon dioxide has made slow progress but is finally hitting the market" Mar. 19, 2015, https://www.technologyreview.com/s/535646/what-happened-to-green-concrete.

*Primary Examiner* — Anthony J Green
(74) *Attorney, Agent, or Firm* — Collard & Roe, P.C.

(57) ABSTRACT

A method of manufacturing building elements has the steps: providing a binder comprising at least 8% by weight ternesite, at least 15% by weight dicalcium silicate and at least 5% by weight ye'elimite, each with respect to the total binder, as hydraulically reactive phases; mixing the binder with water to form a paste; casting the paste into a desired shape for the building element; reacting the paste hydraulically to form calcium-silicate-hydrates, calcium-aluminium-silicate-hydrates, portlandite, brucite, strätlingite, hydrotalcite-like phases and ettringite/AFm and capillary pores, and carbonation hardening to provide the building element and to building elements obtainable by the method.

22 Claims, 5 Drawing Sheets

BUILDING ELEMENTS MADE FROM BINDERS HARDENING BY COMBINED HYDRATION AND CARBONATION

CROSS REFERENCE TO RELATED APPLICATIONS

This application is the National Stage of PCT/EP2018/075,199 filed on Sep. 18, 2018, which claims priority under 35 U.S.C. § 119 of European Application No. 17195448.0 filed on Oct. 9, 2017, the disclosures of which are incorporated by reference. The international application under PCT article 21(2) was published in English.

BACKGROUND OF THE INVENTION

The present invention relates to novel building elements obtained from binders that rely on hydration with subsequent carbonation for hardening.

Cement and products made with it like concrete, mortar etc. are wide spread and versatile construction materials. However, cement is also responsible for a considerable amount of energy consumption and $CO_2$ emission, as well as requiring large amounts of valuable raw materials. Thus, many different proposals for saving natural raw materials, energy and $CO_2$ emission have been made.

One of them is the use of binders hardening through carbonation, see e.g. U.S. 2011/0165400 A1, U.S. 2012/0312194 A1, and WO 2016/022,485 A1. Already the reduction of the Ca/Si ratio in the raw material descreases the amount of $CO_2$ released and the absorption of it during hardening multiplies the effect. This and further approaches are also described in https://www.technologyreview.com/s/535646/what-happened-to-green-concrete. Accordingly, Novacem relies on a replacement of Portland cement with magnesium oxide material that hardens by carbonation. Calera reacts carbon dioxide from exhaust gases to form calcium carbonate powder (vaterite polymorph) that in turn is useful as a binder (forming continuous aragonite structures). Carbstone and Solidia rely on materials that harden directly by carbonation.

However, in contrast to Portland cement hardening through hydration with the water present in the paste the carbonating binders need $CO_2$ in relevant amounts and also in high concentration when hardening shall take place without long curing times. Although $CO_2$ is present in the pore solution of the paste, its amount is usually too low. Supply from the surrounding atmosphere via diffusion takes too long. So elevated temperatures and aqueous solutions of $CO_2$ or high pressure $CO_2$ are deemed necessary. These are expensive and also not possible for all uses.

Surprisingly it was now found that binders comprising ternesite, dicalcium silicate and ye'elimite as hydraulically reactive phases set and harden hydraulically to provide carbonation phases with a porosity that allows an improved carbonation hardening. The hydraulic reaction provides setting, optionally some hardening, and green strength of the binder paste and at the same time creates carbonatable phases and, by a self desiccating action, a porosity for fast and enhanced carbonation hardening. Naturally, it cannot be excluded that some carbonation already takes place during the hydration step due to carbon dioxide available in the paste and that some hydration will continue during the carbonation step as long as hydratable phases and water are present. But the main reactions are hydration in the first step and carbonation in the second step.

SUMMARY OF THE INVENTION

Therefore, the above objects are solved by building elements made from a binder comprising at least 8% by weight ternesite, at least 15% by weight dicalcium silicate and at least 5% by weight ye'elimite as hydraulically reactive phases, which is reacted hydraulically to form hydrated phases and capillary pores enabling carbonation hardening to provide the building element. The sum of all components, including other phases including the nonreactive phases, sums up to 100% by weight.

So as to simplify the description the following abbreviations that are usual in the field of cement are used herein: H—$H_2O$, C—CaO, A—$Al_2O_3$, F—$Fe_2O_3$, M—MgO, S—$SiO_2$ and \$-$SO_3$. Compounds are mostly named by the pure form, without explicit mentioning of solid solutions, foreign ion substitution and impurities etc. as are usual in technical and industrial materials. As the man skilled in the art knows, the exact composition of the phases described may vary due to substitution with foreign ions. Such compounds are comprised when mentioning the pure form herein unless it is expressly stated otherwise.

Dicalcium silicate is used here as a term for several types of dicalcium silicate forms such as, but not limited to, belite, gamma-$C_2S$ and different types of alpha-$C_2S$. Typically, dicalcium silicates are present in several polymorphs in clinkers like ordinary Portland cement (OPC) and calcium sulfoaluminate (CSA) and form complex solid solutions by incorporating foreign elements. These solid solutions are also included in the term dicalcium silicate. Ye'elimite designates the phase $C_4A_3$\$ including especially forms wherein Al is substituted by iron also in substantial amounts of up to 80% substitution. Ternesite means $C_5S_2$\$.

The term "reactive" shall mean a hydraulic reactivity unless specified otherwise. Hydraulic reactivity designates the reaction of a compound with water or other water containing compounds to form hydrated phases including a reaction of two or more compounds occurring simultaneously.

Herein, clinker designates a sinter product obtained by burning a raw material at elevated temperature and containing at least one hydraulic phase. Burning means a change of one or more property of the starting material such as chemistry, crystallinity, phase composition, spatial arrangement and bonds of lattice atoms which is brought about by a supply of thermal energy. The starting material may be a single material, but usually it is a mixture. The starting material is typically finely ground and then designated as raw meal. The starting material may contain mineralizers, which are substances decreasing the temperature necessary for melting and/or act as fluxes and/or enhance clinker formation e.g. by forming solid solutions or stabilisation of phases. Mineralizers can be part of the starting material components or be added as separate component.

Cement is used to designate a material that, after mixing with a liquid to form a paste, is able to develop mechanical strength by hydraulic reaction. Thus, cement denotes a clinker ground with or without further components, and other mixtures like super sulphated cement, geopolymer binder, and dicalcium silicate cement obtained by hydrothermal treatment. Binder or binder mixture means a material or mixture containing cement and developing mechanical strength by a hydraulic reaction with water or otherwise like by carbonation, wherein the binder typically but not necessarily contains more components than the cement. A binder is used adding water or another liquid and mostly also aggregate as well as optionally admixtures and/or additives.

The binder from which the building element according to the invention is formed can be made from a very wide variety of materials, among them side products and wastes that can up to now not be used or only be used to a limited degree. Independent from the manufacturing of the binder, that may or may not save energy compared to producing other binders, there is a significant reduction of $CO_2$ generation, since hardening consumes $CO_2$.

Compared to known binders that harden by carbonation the binder according to the invention neither needs high grade raw materials nor expensive and demanding curing. The manufacturing of a clinker comprising ternesite, dicalcium silicate and ye'elimite allows the use of low grade raw materials and requires lower temperatures than for many other clinker types. Due to the self-desiccation the $CO_2$ can easier access the whole structure in gaseous form, so that even at low temperature and with low $CO_2$ concentration and pressure a fast carbonation is achieved. Prior proposals relied on dissolving $CO_2$ in water and temperatures of 90° C. Increased temperatures for curing consumes part of the $CO_2$ savings achieved and moreover requires elaborate devices. The binder paste according to the invention can be cast like Portland cement (OPC) and hardens at ambient conditions like OPC.

One important feature of the binder according to the invention is that both hydraulically reactive phases and phases hardening by carbonation are available. The proportion of hydraulic phases in the binder can range from 28 to 100% by weight. Preferably at least 40% by weight, more preferred at least 50% by weight and most preferred at least 60% by weight hydraulic phases are contained.

The most important hydraulically reactive phases are ternesite, dicalcium silicate and ye'elimite. Further, ferritic phases $C_6A_xF_y$ with x+y=3 and both x and y≥0 and x≤y, e.g. $C_4AF$, $C_2F$, ellestadite and XRD-amorphous hydraulic phases, e.g. glass-like materials, slags and ashes, are suitable. Alite is possible, but in view of the high energy and associated $CO_2$ emission associated with its production it is less preferred. Unlike OPC the binder according to the invention neither needs nor significantly profits from alite as hydraulic phase. Carbonatable phases can be present in small amounts from the beginning, e.g. periclase, free lime or portlandite. Typically, the hydrated products of the hydraulically reactive phases like calcium-silicate-hydrates, calcium-aluminium-silicate-hydrates, aluminium-silicate-hydrates, portlandite, brucite, stratlingite, hydrotalcite-like phases and ettringite/AFm form the major part of the carbonation phases contributing to ultimate strength.

The hardening mechanism of the binder according to the invention is illustrated in FIG. 1. Initially, the binder particles B are suspended in water W, left side. The hydraulic reaction consumes water and provides a layer of hydrated phases H around the binder particles comprising hydraulically reactive phases, see middle. The consumed water leaves pores P behind (self-desiccation) and the hydration product provides a first setting and hardening of the paste. Often, the setting and hardening by hydraulic reaction provides products with sufficient green strength for demolding. The final hardening by carbonation provides binder particles B with a layer L from hydrated and carbonated phases, see right side of the figure. Of course, this very schematic figure merely illustrates the principle, reality will be more complex, e.g. binder particles can be converted completely into hydrated and carbonated phases. Also, carbonation can start right away, although the main part of the carbonation occurs only when the hydraulic reaction has created pores and hydrates. There might be hydrated phases left in the final product. Binder particles containing only carbonating phases will not hydrate.

To allow the self-desiccation to take place the water/binder ratio (w/b) of the binder paste according to the invention has to be carefully adjusted. It will range from 0.2 to 1.2, preferably from 0.25 to 0.8 and most preferred from 0.35 to 0.6 with respect to the sum of hydraulically reactive phases of the binder. Naturally, the w/b has to be adapted to the targeted properties of the product.

Additionally, consistency of the paste has to be adapted. Since the w/b is typically low for binder pastes according to the invention it will often be necessary to add admixtures like water reducing agents, plasticizers and super plasticizers to adjust consistency while keeping the w/b in the range suitable for self-desiccation. Useful water reducing agents, plasticizers and super plasticizers are for example, but not exclusively, organic compounds with one or more from carboxylate, sulfonate, phosphonate, phosphate or alcohol functional groups. Other admixtures that influence workability are retarders. They mainly aim at prolonging the time that a specified consistency is maintained. Retarders slow the setting and/or hardening of the binder paste. Suitable substances are for example, but not exclusively, phosphates, borates, salts of Pb, Zn, Cu, As, Sb, lignosulphonates, hydroxyl-carboxylic acid and their salts, phosphonates, sugars (saccharides).

Ternesite dicalcium silicate calcium sulphoaluminate cements (BCT) or ternesite dicalcium silicate calcium sulphoaluminate ferrite cements (TBF) are used to provide the binder according to the invention. They can be made e.g. as described in WO 2013/023,731 A2 (BCT) and WO 2013/023,729 A2 (TBF), respectively. The BCT and TBF cements contain high amounts of dicalcium silicate besides ternesite and ye'elimite and often have a high content of unwanted elements such as heavy metals. Their hydraulic properties are frequently not sufficient for use as hydraulically hardening binder, but they are too reactive for use as supplementary cementitious materials in OPC based binders.

Typical compositions for BCT are:
8 to 75% by weight ternesite, preferably 10 to 60% by weight, most preferred 20 to 40% by weight;
15 to 70% by weight dicalcium silicate, preferably 20 to 60% by weight, most preferred 30 to 50% by weight;
5 to 70% by weight ye'elimite, preferably 10 to 60% by weight, most preferred 20 to 45% by weight;
0 to 30% by weight $C_4AF$, preferably 3 to 25% by weight, most preferred 5 to 15% by weight;
0 to 20% by weight $C_2F$, preferably 2 to 15% by weight, most preferred 3 to 8% by weight;
0 to 30% by weight hydraulic X-ray amorphous phase, preferably 2 to 25% by weight, most preferred 5 to 20% by weight;
0 to 30% by weight minor phases.

Typical compositions for TBF are:
20 to 95% by weight ternesite, preferably 30 to 85% by weight, most preferred 40 to 75% by weight;
5 to 80% by weight dicalcium silicate, preferably 15 to 70% by weight, most preferred 20 to 60% by weight;
5 to <15% by weight ye'elimite, preferably 5 to 12% by weight, most preferred 5 to 10% by weight
0 to 30% by weight $C_4AF$, preferably 3 to 25% by weight, most preferred 5 to 20% by weight
0 to 20% by weight $C_2F$, preferably 2 to 15% by weight, most preferred 3 to 8% by weight 0 to 30% by weight hydraulic X-ray amorphous phase, preferably 2 to 25% by weight, most preferred 5 to 20% by weight 0 to 30% by weight minor phases. All amounts relative to the total binder phases and with the proviso that the sum of all phases including optional further components amounts to 100%. The minor phases summarize components, hydraulic or not, that are contained in individual amounts of less than 10% by weight, typically less than 5% by weight or even only in trace amounts. Usual minor phases are anhydrite, lime, periclase, quartz, hematite, Ca-langbeinite, maghemite, akermanite. Besides these, one or more of γ-belite, ellestadite, krotite, mayenite, grossite, srebrodolskit, hydroxylellestadite, gehlenite, α-belite, rankinite, alite, calcite, dolomite, corundum, (para)wollastonite, forsterit, enstatit, fayalite, aluminate, magnetite, mullite, fluor-chlor-apatite, dodecacalcium potassium fluoride dioxide tetrakis(silicate), arcanite, langbeinite, aphthitalite, thernadite, bassanite, gypsum, sylvite, halite, syngenite, portlandite, tetracalcium aluminate hydrate, hydrocalumite, monosulphate, perovskite, rutil, anatase, fluβspat, austenite, merwinite, bredigite, jasmundite, and oldhamite can be present.

These cements can be made using high amounts of industrial by-products and low grade precursor materials not applicable for OPC production in substantial amounts such as slags, ashes, quarry overburdens, quarry dusts, demolished construction wastes, waste glass, waste gypsum, and mixtures thereof.

The raw materials are selected and if needed mixed to provide a suitable raw meal. An adapted Bogue calculation can be used to determine suitable amounts. The raw meal is converted e.g. in a rotary kiln equipped with a device for tempering the clinker to ensure a sufficient ternesite content. The clinker is then ground to obtain the cement. Typically, other components like admixtures and especially additives are mixed with the cement to make the binder, but the cement can also be used without additives. The clinker as well as the cement and binder obtained will normally have a low Ca content compared to OPC, rendering many such cements useless for conventional solely hydraulic hardening. But according to the invention the provided low hydraulic reactivity suffices, since a fast carbonation provides the needed strength, often a very high strength, within suitable times.

The BCT and TBF clinkers can have a composition allowing their use as binder according to the invention on their own. In many cases especially the TBF clinkers will be combined with e.g. calcium sulfoaluminate clinker or cement to increase the content of ye'elimite and/or OPC or another belite clinker or cement to increase dicalcium silicate. Also, the addition of sulfate is contemplated in case its amount is lower than desirable. A useful composition for the binder is:

8 to 75% by weight ternesite, preferably 10 to 60% by weight, most preferred 20 to 40% by weight;
15 to 80% by weight dicalcium silicate, preferably 10 to 60% by weight, most preferred 20 to 50% by weight;
5 to 70% by weight ye'elimite, preferably 10 to 60% by weight, most preferred 20 to 45% by weight;
0 to 50% by weight $C_6A_xF_y$ with $x+y=3$ and both x and $y \geq 0$ and $x \leq y$, preferably 3 to 25% by weight, most preferred 5 to 15% by weight;
0 to 20% by weight reactive aluminates, preferably 0.5 to 10% by weight, most preferred 1 to 5% by weight;
0 to 25% by weight periclase, preferably 1 to 20% by weight, most preferred 3 to 10% by weight;
0 to 30% by weight hydraulic X-ray amorphous phase, preferably 2 to 25% by weight, most preferred 5 to 20% by weight; and
0 to 30% by weight minor phases preferably 0 to 15% by weight, most preferred 0 to 5% by weight.

The binder used to make the building elements according to the invention can contain usual admixtures and/or additives. The admixtures and additives known for OPC are useful, as well as specific ones adapted to other binders such as calcium sulphoaluminate cement and calcium aluminate cement.

Often used admixtures are water reducing agents and plasticizers like for example, but not exclusively, organic compounds with one or more from carboxylate, sulfonate, phosphonate, phosphate or alcohol functional groups. These serve to achieve a good consistency, i.e. flowability, of the paste with a smaller amount of water. Since a decrease of w/b normally provides an increase of strength, such admixtures are commonly used. Air entraining agents are also able to improve flowability and can be used for this aim or for other reasons such as, but not limited to, density modifications and compactability improvements.

Furthermore, it is possible to add activators that promote hydraulic reactivity of the cement phases and/or carbonation activity of the hydrates and anhydrous phases. Examples of such substances are e.g. alkali and alkaline earth metals hydroxides, nitrates, sulfates, chlorides, silicates, (hydro-)carbonates or organic compounds such as glycerin, organic acids and their salts, cyanates and amines e.g. triethanolamine, triisopropanolamine, diethanolisopropanolamine. It is to be noted that some of these may act as retarders and accelerators depending of the dosage.

Special admixtures can be added in order to improve the dissolution of the carbonate ions in the interacting solutions and consequently to accelerate the carbonation process. These can be aqueous solvents like alkanolamines, e.g. primary amines like monoethanolamine (MEA) and diglycolamine (DGA), secondary amines like diethanolamine (DEA) and diisopropanolamine (DIPA), and tertiary amines like methyldiethanolamine (MDEA) and triethanolamine (TEA), or any mixture of them or soluble alkali salts and hydroxides or other substances that can be used for improving $CO_2$ dissolution in the solution. Additionally, enzymes such as carbonic anhydrase (CA) can be used to enhance carbonation efficiency and modify the properties of the reaction products. It is to be noted that these admixtures have not only one action but can exercise a double role. They can modify the hydration process as well as modify the carbonation process as well as the morphology and microstructure of the products formed. The effect can largely depend on the dosage.

Also it is possible to add admixtures that modify the morphology of the precipitating calcite during the hydration-carbonation process. This provides the advantage of building less dense shales of hydrates-carbonates product and enables higher carbonation and hydration degress. Suitable are for example magnesium salts, poly(acrylic acids), polyacrylamide, poly(vinyl alcohol), polyvinylsulfonic acids, styrenesulfonate, citric acid and other organic acids, polysaccharides and other substances, e.g. phosphonates, polycarboxylates. It is to be noted that these admixtures have not only one action but can exercise a double role.

Moreover it is possible to add admixtures that regulate the pH during the hydration—carbonation process in order to enhance the precipitation of the calcite, these include metal hydroxides and carbonates and similar substances. It is to be noted that these admixtures have not only one action but can exercise a double role.

All admixtures are used in the amounts known as such, wherein the amount is adapted to a specific binder and special needs in the known manner.

Additives are e.g. fillers, pigments, reinforcing elements, self-healing agents. Typical fillers are mineral particles like stone dust as well as fibres such as glass, metal and/or polymer fibres. An addition which is also used as supplementary cementitious material is silica fume. All these can be added in the amounts known per se.

A preferred use of the binder according to the invention is pre cast concrete and concrete goods production. The binder is typically mixed with aggregate and water as well as with admixtures and/or additives as desired. The construction material thus obtained is then used as known per se.

In contrast to known hydraulically hardening materials the carbonation follows when the hydraulic reaction provides enough porosity. So hardening should not take place under water or with constant water supply. Instead an atmosphere containing and preferably rich in $CO_2$ is provided. In contrast to materials hardening through carbonation the binder according to the invention and construction materials containing it need water in defined quantity to provide the first setting (and hardening if applicable) including the creation of additional porosity.

Carbonation for final hardening requires $CO_2$ that is present in normal atmosphere. To achieve hardening within acceptable times the carbonation is accelerated by supplying an atmosphere rich in $CO_2$. For example, the molds can be placed inside a suitable space and $CO_2$ rich exhaust gas, e.g. cement kiln flue gas, passed into the space.

The curing time depends on process conditions and material composition such as temperature, $CO_2$ pressure, water vapor pressure, sample thickness, water-to-cement ratio, amount of hydraulically reactive phases, hydrates formed prior to carbonation, concrete porosity. Typical carbonation times for $CO_2$ pressure in the range of 0.005 to 2 MPa, preferably 0.05 to 0.5 MPa, and temperatures from ambient to 100° C., preferably up to 50° C., most preferred at ambient meaning 15 to 35° C., are from 10 minutes to 48 hours.

The building element obtained after final hardening by carbonation usually shows high strength and durability.

DETAILED DESCRIPTION OF THE INVENTION

The invention will be illustrated further with reference to the examples that follow, without restricting the scope to the specific embodiments described. If not otherwise specified any amount in % or parts is by weight and in the case of doubt referring to the total weight of the composition/mixture concerned.

The invention further includes all combinations of described and especially of preferred features that do not exclude each other. A characterization as "approximately", "around" and similar expression in relation to a numerical value means that up to 10% higher and lower values are included, preferably up to 5% higher and lower values, and in any case at least up to 1% higher and lower values, the exact value being the most preferred value or limit.

The term "substantially free" means that a particular material is not purposefully added to a composition, and is only present in trace amounts or as an impurity. As used herein, unless indicated otherwise, the term "free from" means that a composition does not comprise a particular material, i.e. the composition comprises 0 weight percent of such material.

EXAMPLE 1

A TBF cement with the oxide composition presented in table 1 was used. It contained, according to XRD Rietveld, 23.6% by weight ternesite, 23.3% by weight dicalcium silicate, 11.8% by weight ye'elimite, 6.1% by weight $C_4AF$, 3.7% by weight $C_2F$, 19.2% by weight amorphous hydraulic phase, and 12.3% by weight minor phases, including anhydrite, lime, periclase, quartz, hematite, Ca-langbeinite, maghemite, akermanite each in an amount below 2% by weight. The density was 3.16 g/cm$^3$, the fineness according to Blaine 2020 cm$^2$/g.

TABLE 1

| | |
|---|---|
| LOI 1050° C. | 0.31% by weight |
| SiO2 | 18.42% by weight |
| Al2O3 | 8.42% by weight |
| TiO2 | 0.38% by weight |
| MnO | 0.11% by weight |
| Fe2O3 | 10.38% by weight |
| CaO | 49.33% by weight |
| MgO | 2.01% by weight |
| K2O | 0.57% by weight |
| Na2O | 0.3% by weight |
| SO3 | 9.34% by weight |
| P2O5 | 0.39% by weight |
| Sum | 99.96% by weight |

Mortar samples were made from water, cement and sand in a weight ratio 0.5:1:1.3 and pastes from water and cement in a ratio 0.5:1. Mixing was carried out in a Hobart mixer, 15 sec. slow and 15 sec. fast as specified in EN 196. All samples were initially hydrated for 18 h in sealed containers at 50° C. Afterwards, the samples were dried in an oven at 50° C. and either stored under ambient air at 20° C. and relative humidity of about 55% (reference sample) or under 2.5 bar $CO_2$ at 20° C. (carbonated sample). Paste samples were crushed to <2 mm before storage in ambient air or under $CO_2$ pressure. The compressive strength of hardened mortar samples was determined according to the procedure specified in EN 196 and hardened pastes and mortars were examined with thermogravimetry in Netzsch Jupiter STA 449 device.

Figure 1:
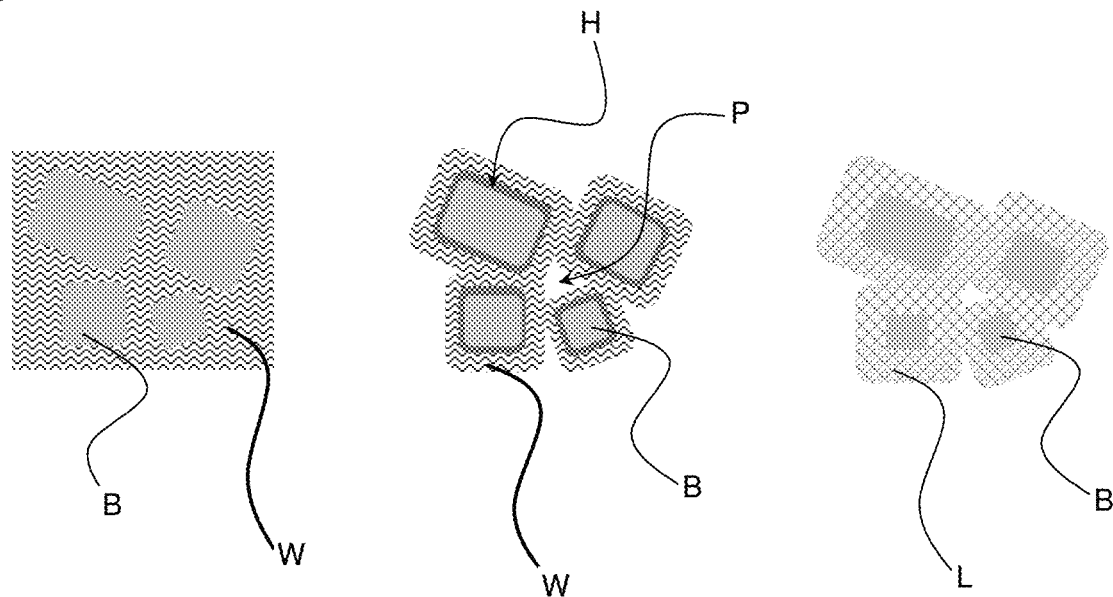
FIG. 1 shows the hardening mechanism of the binder according to the invention.
Figure 2:
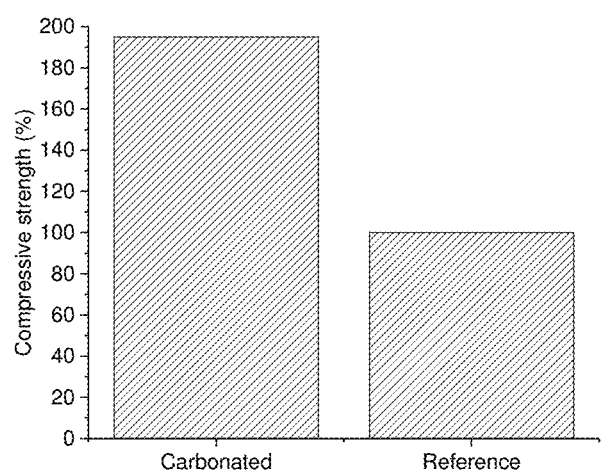
FIG. 2 shows a graph of the compressive strength of the samples

The compressive strength of the samples is depicted in FIG. 2, it can be seen that carbonation almost doubled compressive strength. The samples gained on average 0.6 g corresponding to about 10% cement mass during carbonation. This mass change includes the $CO_2$ bound as well as water lost during the carbonation. To distinguish between these two mass changes, a differential thermogravimetric analysis (TG) was made.

Figure 3:
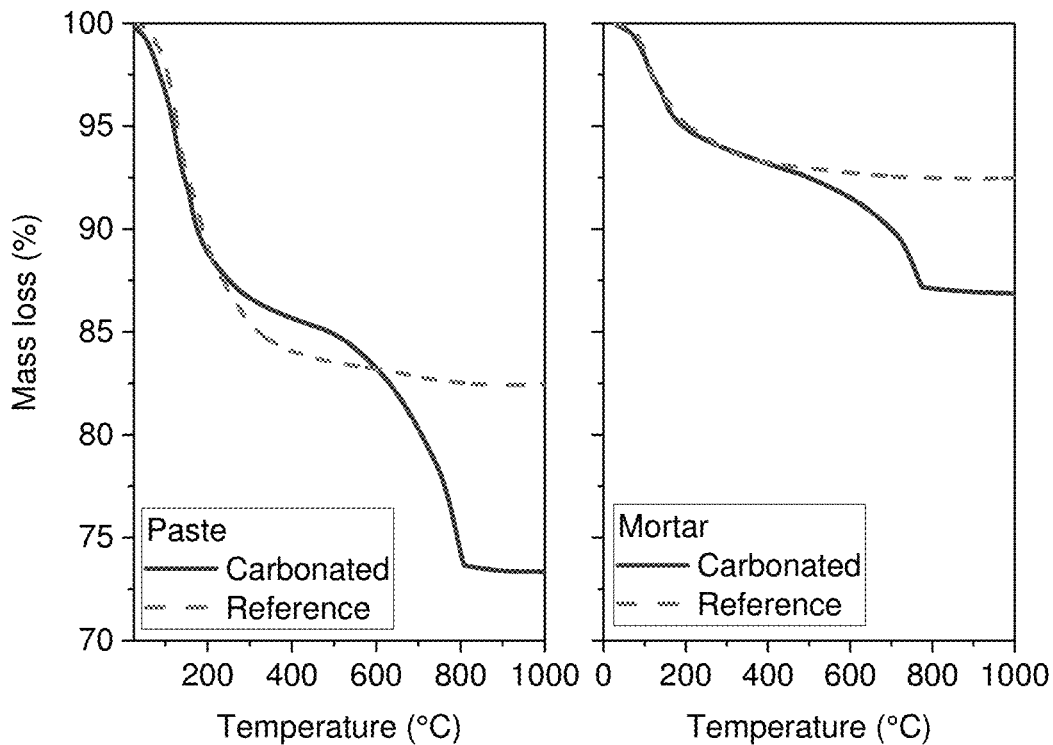
FIG. 3 shows the results of TG measurements of the hardened paste and mortar.

FIG. 3 shows the results of TG measurements on the hardened paste and mortar. The weight loss from about 500° C. to about 850° C. shows that a significant amount of calcite was formed during carbonation. Pastes gained about 28% calcite corresponding to about 15% mass gain and mortars gained about 13% calcite corresponding to about 6% of mortar mass corresponding to about 14% of cement mass.

EXAMPLE 2

The same clinker as in example 1 was used, however, ground to a fineness of 2910 $cm^2/g$ according to Blaine. Mortar and paste samples were made analogously to example 1. All samples were initially hydrated for 24 h in sealed containers at 50° C. Afterwards, the samples were treated with one or more of the following:
D: dried 24 h in an oven at 50° C.
L: stored 24 h under ambient air at 20° C. and relative humidity of about 55%
$CO_2$: stored 24 h under 2.5 bar $CO_2$ at 20° C.
The compressive strength and density of hardened mortar samples was determined according to the procedure described in EN 196 and hardened pastes and mortars were examined with thermogravimetry in Netzsch Jupiter STA 449 device.

Figure 4:
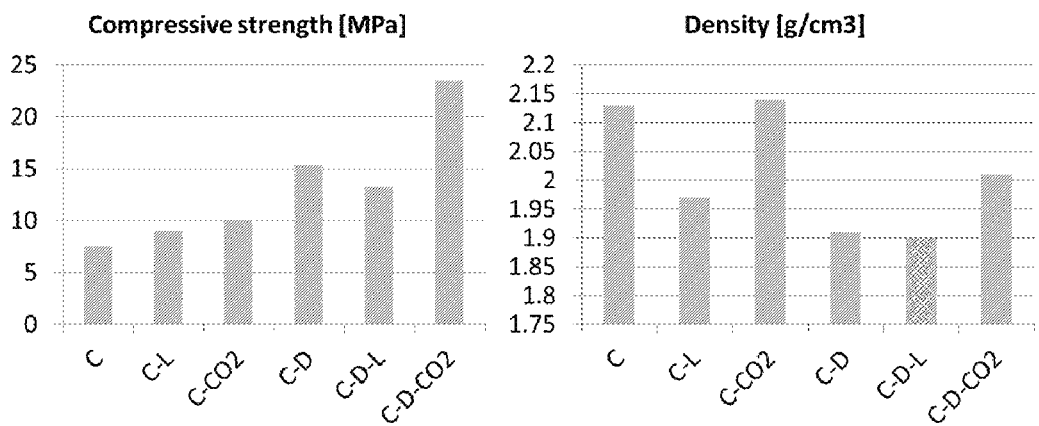
FIG. 4 shows a graph of the compressive strength and density measured on the mortar samples.

FIG. 4 shows the compressive strength and density measured on the mortar samples. The comparison of the strength for sample C—CO2 that is hydrated and carbonated with C—L that is only hydrated (but hydrated longer than C—$CO_2$) shows that carbonation improves hardening, higher strength is gained by subsequent carbonation than with prolonged hydration. The drying at elevated temperature enhances hardening in itself by accelerating hydration and improving carbonation. Thus, sample C—D that is only hydrated but longer than sample C—L has a higher strength than that, but carrying out carbonation according to the invention provides much higher strength as shown by sample C—D—$CO_2$. These findings are confirmed by the measured densities. The gained 0.1 $g/cm^3$ correspond to the bound $CO_2$ in the carbonated samples.

Figure 5A:
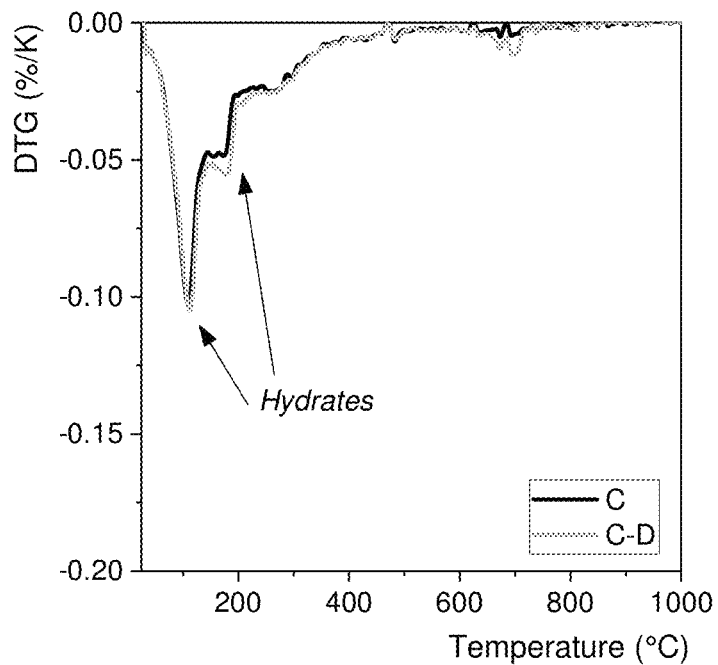
FIGS. 5a and 5b show the result of differential gravimetric analysis.
Figure 5B:
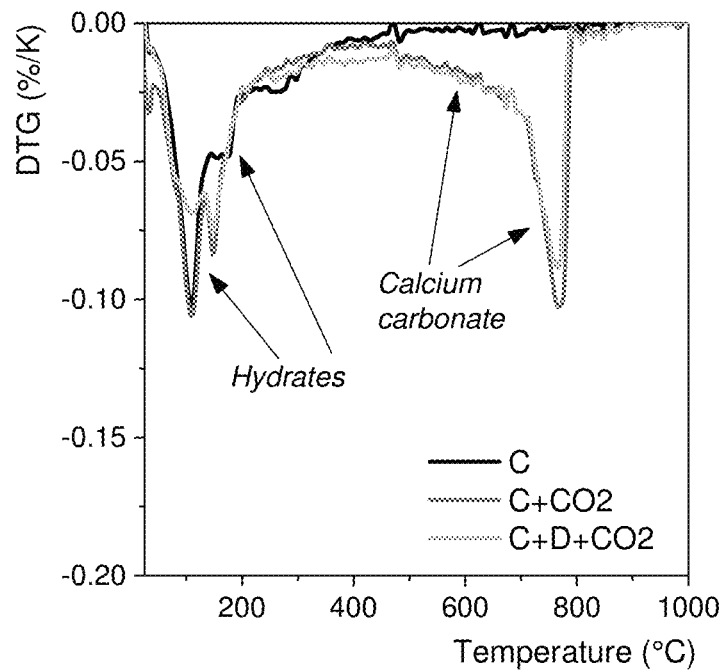

The result of differential thermogravimetric analysis is shown in FIGS. 5a and 5b. It can be seen in FIG. 5a that drying does not change the hydrates formed initially, compare sample C only hydrated with sample C—D that was hydrated and dried in an oven. During carbonation under 2.5 bar $CO_2$ the hydrates partially decompose and form carbonates, compare samples C+$CO_2$ and C+D+$CO_2$ with sample C in FIG. 5b. The mass loss between ~500° C. and ~850° C. is due to decomposition of $CaCO_3$ and shows that about 40% of CaO is bound as carbonate during carbonation.

Figure 6:
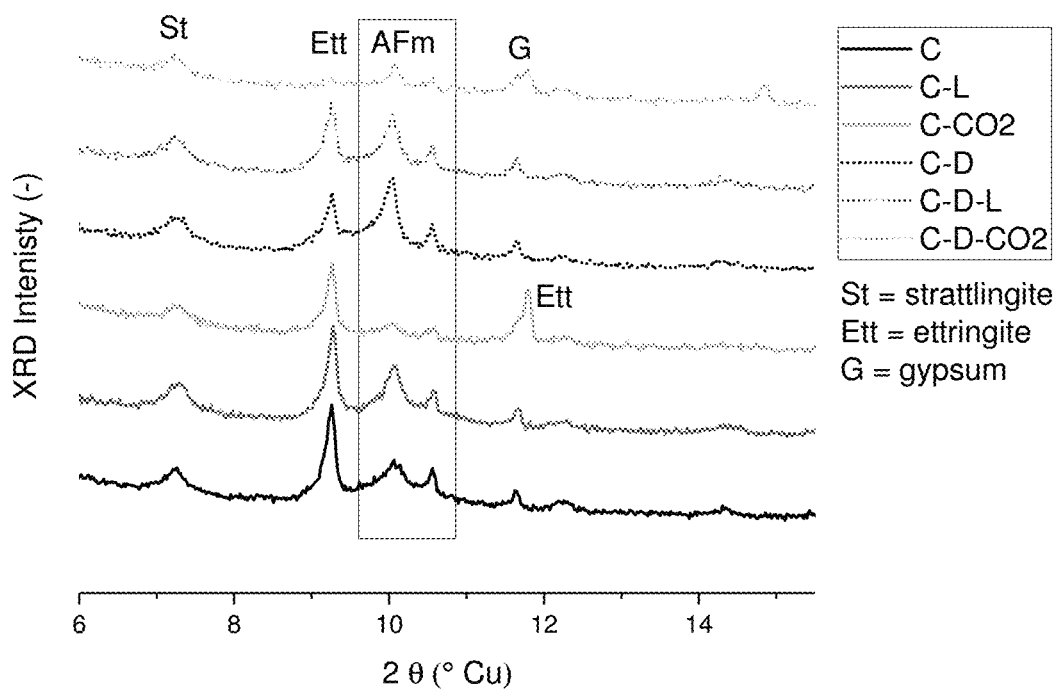
FIG. 6 shows the XRD spectra.

FIG. 6 shows the XRD spectra. The TG result is confirmed, namely that drying does not change the hydrates. Further, carbonation of AFm takes place in all samples carbonated with 2.5 bar $CO_2$. Carbonation of ettringite only occurs in dried samples.

EXAMPLE 3

Figure 7A:
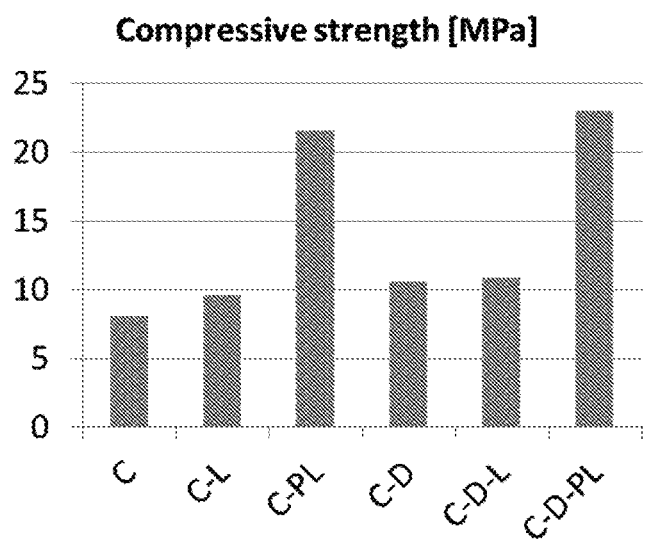
FIGS. 7a and 7b show the strength and thermogravimetric behavior measurements of mortars and pastes made according to the invention.
Figure 7B:
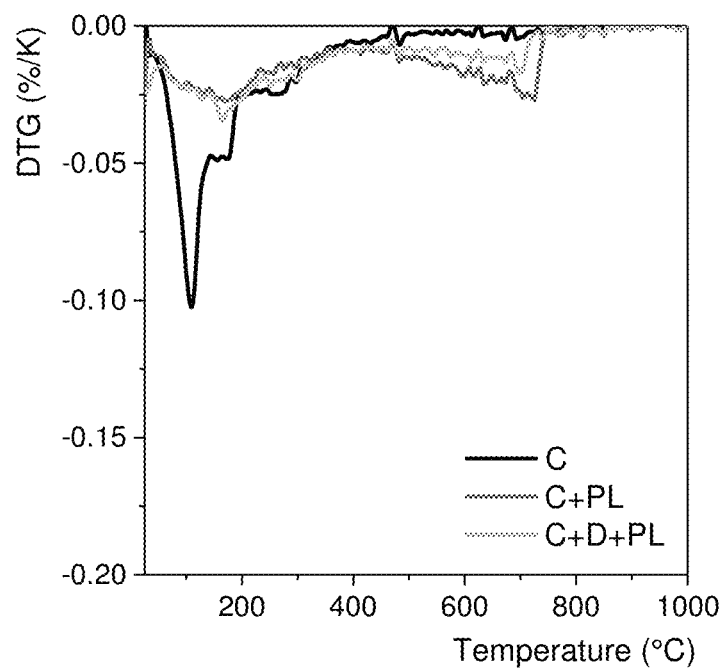

Mortars and pastes were made analogously to example 2 from the cement used in example 1. In addition to the treatments in example 2, samples were carbonated by placing them 24 h in the chimney of the operating cement plant. Thus, carbonation took place in cement plant exhaust gas for samples designated PI. Like in example 2 the strength and thermogravimetric behavior were measured. The results are shown in FIGS. 7a and 7b and confirm that cement plant exhaust gas is a very suitable medium for carbonation.

Last but not least, carbonation depth was measured by spraying with 1% by weight thymolphthalein in a mixture of 70 Vol. % ethanol and 30 Vol. % water. All samples carbonated in exhaust gas showed no coloring at all, i.e. were fully carbonated. In contrast, the reference samples that were only dried or stored in ambient air were deeply coloured.

What is claimed is:

1. A method of manufacturing building elements comprising the steps:
providing a binder comprising at least 8% by weight ternesite, at least 15% by weight dicalcium silicate and at least 5% by weight ye'elimite, each with respect to the total binder, as hydraulically reactive phases
mixing the binder with water to form a paste
casting the paste into a shape for the building element
reacting the paste hydraulically to form hydrated phases and to create additional capillary pores, and
carbonation hardening to provide the building element.

2. The method according to claim 1, wherein the binder contains at least 28% by weight hydraulically reactive phases relative to the total binder weight.

3. The method according to claim 1, wherein in addition to ternesite, dicalcium silicate, and ye'elimite at least one additional hydraulically reactive phase selected from the group consisting of ellestadite, ferritic phases, and amorphous hydraulic phases is contained.

4. The method according to claim 1, wherein the water-to-binder ratio with respect to the sum of hydraulically reactive phases in binder is set from 0.2 to 1.2.

5. The method according to claim 1, wherein the hydrated phases of the hydraulically reactive phases form a major part of the phases hardening by carbonation.

6. The method according to claim 1, wherein periclase or free lime hardening by carbonation are present in the provided binder in an amount of up to 15% by weight each and up to 30% combined.

7. The method according to claim 1, wherein at least one of water reducing agents, plasticizers and/or super plasticizers are added to adjust consistency while keeping the water-to-binder ratio in the range suitable for self-desiccation.

8. The method according to claim 1, wherein air entraining agents are added to the binder.

9. The method according to claim 1, wherein additives are added, selected from the group consisting of fillers, pigments, reinforcing elements, and self-healing agents.

10. The method according to claim 1, wherein the binder contains
8 to 75% by weight ternesite,
15 to 80% by weight dicalcium silicate,
5 to 70% by weight ye'elimite,
0 to 50% by weight $C_6A_xF_y$ with x+y=3 and both x and y≥0 and x≤y,
0 to 20% by weight reactive aluminates
0 to 30% by weight hydraulic X-ray amorphous phase,
0 to 30% by weight minor phases,
all with respect to the total amount of binder.

11. The method according to claim 1, wherein the paste is subjected to hydraulic hardening within an atmosphere of 40 to 99% relative humidity and having a temperature from 10 to 80° C.

12. The method according to claim 1, wherein carbonation takes place in an atmosphere rich in $CO_2$ that has a pressure of $CO_2$ ranging from of 0.005 to 2 MPa, and a temperature in the range from 15° C. up to 100° C.

13. The method according to claim 12, wherein $CO_2$ rich exhaust gas is used to provide the atmosphere rich in $CO_2$.

14. A building element obtained from a binder comprising at least 8% by weight ternesite, at least 15% by weight dicalcium silicate and at least 5% by weight ye'elimite as hydraulically reactive phases, by a method according to claim 1.

15. The building element according to claim 14 in the form of a pre-cast concrete element.

16. The method according to claim 1, wherein the binder contains at least 50% by weight hydraulically reactive phases relative to the total binder weight.

17. The method according to claim 1, wherein the water-to-binder ratio with respect to the sum of hydraulically reactive phases in the binder is set from 0.25 to 0.8.

18. The method according to claim 1, wherein the water-to-binder ratio with respect to the sum of hydraulically reactive phases in the binder is set from 0.35 to 0.6.

19. The method according to claim 10, wherein the water-to-binder ratio with respect to the sum of hydraulically reactive phases in the binder is set from 0.25 to 0.8.

20. The method according to claim 10, wherein the paste is subjected to hydraulic hardening within an atmosphere of 40 to 99% relative humidity and having a temperature from 10 to 80° C.

21. The method according to claim 12, wherein the atmosphere rich in $CO_2$ has pressure of $CO_2$ ranging from 0.05 to 0.5 MPa and a temperature ranging from 15° C. up to 50° C.

22. The method according to claim 21, wherein the binder contains 8 to 75% by weight ternesite,
15 to 80% by weight dicalcium silicate,
5 to 70% by weight ye'elimite,
0 to 50% by weight $C_6A_xF_y$ with x+y=3 and both x and y≥0 and x≤y,
0 to 20% by weight reactive aluminates
0 to 30% by weight hydraulic X-ray amorphous phase,
0 to 30% by weight minor phases,
all with respect to the total amount of binder, and the water-binder ratio with respect to the sum of hydraulically reactive phases in the binder is set from 0.35 to 0.6.

\* \* \* \* \*